(12) United States Patent
Kimura et al.

(10) Patent No.: US 10,207,613 B2
(45) Date of Patent: Feb. 19, 2019

(54) ARMREST FOR VEHICLE SEAT

(71) Applicant: TOYOTA BOSHOKU KABUSHIKI KAISHA, Aichi-ken (JP)

(72) Inventors: Koji Kimura, Aichi (JP); Seigo Nakamura, Aichi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/824,232

(22) Filed: Nov. 28, 2017

(65) Prior Publication Data
US 2018/0154809 A1 Jun. 7, 2018

(30) Foreign Application Priority Data
Dec. 1, 2016 (JP) ................................. 2016-234228

(51) Int. Cl.
*A47C 7/62* (2006.01)
*B60N 2/75* (2018.01)
*B60N 3/10* (2006.01)

(52) U.S. Cl.
CPC ............... *B60N 2/757* (2018.02); *B60N 2/79* (2018.02); *B60N 3/102* (2013.01)

(58) Field of Classification Search
CPC . A47C 7/62; B60N 2/793; B60N 2/79; B60N 2/757
USPC ................. 297/115, 182, 188.14, 188.15
See application file for complete search history.

(56) References Cited

U.S. PATENT DOCUMENTS

| | | | | |
|---|---|---|---|---|
| 5,524,958 A * | 6/1996 | Wieczorek | ............... | A47C 7/70 297/188.17 |
| 5,800,011 A * | 9/1998 | Spykerman | ............ | B60N 3/106 248/311.2 |
| 6,283,551 B1 * | 9/2001 | Bergin | ..................... | A47C 1/12 297/411.35 |
| 7,568,749 B2 * | 8/2009 | Biggs | ..................... | B60N 3/102 248/311.2 |
| 8,777,307 B2 * | 7/2014 | Nelson | ..................... | A47C 7/70 297/188.14 |
| 8,944,499 B2 * | 2/2015 | Oh | ..................... | B60N 2/5635 297/180.14 |

(Continued)

FOREIGN PATENT DOCUMENTS

JP 2001-197959 7/2001

*Primary Examiner* — Joanne Silbermann
(74) *Attorney, Agent, or Firm* — Greenblum & Bernstein, P.L.C.

(57) ABSTRACT

An armrest for a vehicle seat can inhibit liquid droplets formed due to condensation from entering inside of the armrest when cup holders are tilted. The armrest comprises a cup holder portion, a wall-like first blocking portion, and a wall-like second blocking portion. The first blocking portion is provided toward a pivot center line relative to the cup holder portion, extends parallel to the pivot center line, and projects upwardly when the armrest is in the stored position. The second blocking portion extends in a vicinity of a root of the first blocking portion parallel to extending directions of the first blocking portion to be interposed between the cup holder portion and the pivot center line. The second blocking portion comprises at least one first through hole that penetrates the second blocking portion for communication from the cup holder portion toward the pivot center line.

3 Claims, 5 Drawing Sheets

(56) References Cited

U.S. PATENT DOCUMENTS

| | | | | |
|---|---|---|---|---|
| 2006/0060741 A1* | 3/2006 | Yanagita | B60N 3/102 | 248/311.2 |
| 2011/0025105 A1* | 2/2011 | Henke | B60N 3/101 | 297/188.14 |
| 2013/0082492 A1* | 4/2013 | Andersson | B60N 3/102 | 297/188.17 |
| 2015/0191112 A1* | 7/2015 | Kawashima | A47C 7/40 | 297/188.07 |
| 2016/0059761 A1* | 3/2016 | Bohlke | B60N 3/102 | 296/37.8 |
| 2018/0105088 A1* | 4/2018 | Yokoyama | B60N 2/793 | |
| 2018/0154815 A1* | 6/2018 | Karges | B60N 2/79 | |

\* cited by examiner

ARMREST FOR VEHICLE SEAT

CROSS-REFERENCE TO RELATED APPLICATIONS

The present application claims the benefit of Japanese Patent Application No. 2016-234228 filed on Dec. 1, 2016 with the Japan Patent Office, the entire disclosure of which is incorporated herein by reference.

BACKGROUND

The present disclosure is related to an armrest for a vehicle seat that is pivotable between an in-use position where the armrest is substantially horizontal and a stored position where the armrest is at the opposite end of its range of motion from the in-use position.

For example, JP 2001-197959 discloses an armrest for a vehicle having cup holder portions that are supported in a pivotable manner relative to the armrest. The cup holder portions hold, for example, cups, PET bottles, or drink cans.

SUMMARY

For example, on the outer surface of a cold PET bottle or a drink can, liquid droplets are likely to form due to condensation. In the aforementioned JP 2001-197959, liquid droplets formed on the outer surfaces of these containers may flow into the inside of the armrest when the cup holders are tilted, and the liquid droplets may stay inside the armrest.

It is preferable that one aspect of the present disclosure provides an armrest for a vehicle seat that can inhibit liquid droplets formed due to condensation from entering inside of the armrest when the cup holders are tilted.

One aspect of the present disclosure provides an armrest for a vehicle seat. The armrest is attached to the vehicle seat in a pivotable manner between an in-use position and a stored position. The in-use position is where the armrest is substantially horizontal, and the stored position is where the armrest is at an opposite end of a range of motion of the armrest from the in-use position. The armrest comprises a cup holder portion, a first blocking portion, and a second blocking portion. The first blocking portion is disposed toward a pivot center line of the armrest relative to the cup holder portion in a wall-like manner, extends parallel to the pivot center line, and projects upwardly when the armrest is in the stored position. The second blocking portion extends in a vicinity of a root of the first blocking portion in a wall-like manner parallel to extending directions of the first blocking portion so as to be interposed between the cup holder portion and the pivot center line. The second blocking portion comprises at least one first through hole that penetrates the second blocking portion for communication from the cup holder portion toward the pivot center line.

Due to this configuration, when the armrest is brought to the stored position while liquid droplets have accumulated at the bottom of cup holder portion, the liquid droplets are blocked by the first blocking portion. The blocked liquid droplets are discharged from the at least one first through hole provided at the second blocking portion.

The armrest according to the present disclosure may be configured as follows.

When the armrest is in the in-use position, an upper end of the at least one first through hole may be located below the first blocking portion.

Due to this configuration, when the armrest is in the in-use position, the flow of liquid droplets above the at least one first through hole are blocked by the first blocking portion. Accordingly, when the armrest is in the in-use position, liquid droplets that have flowed from the cup holder portion to the second blocking portion are discharged from the at least one first through hole.

The armrest may further comprise a bottom plate disposed below a lower end of the at least one first through hole when the armrest is in the in-use position. The bottom plate may comprise at least one second through hole penetrating the bottom plate.

This configuration enables discharging liquid droplets that have flown from the cup holder portion to the second blocking portion from the at least one second through hole when the armrest is in the in-use position.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

Figure 1:
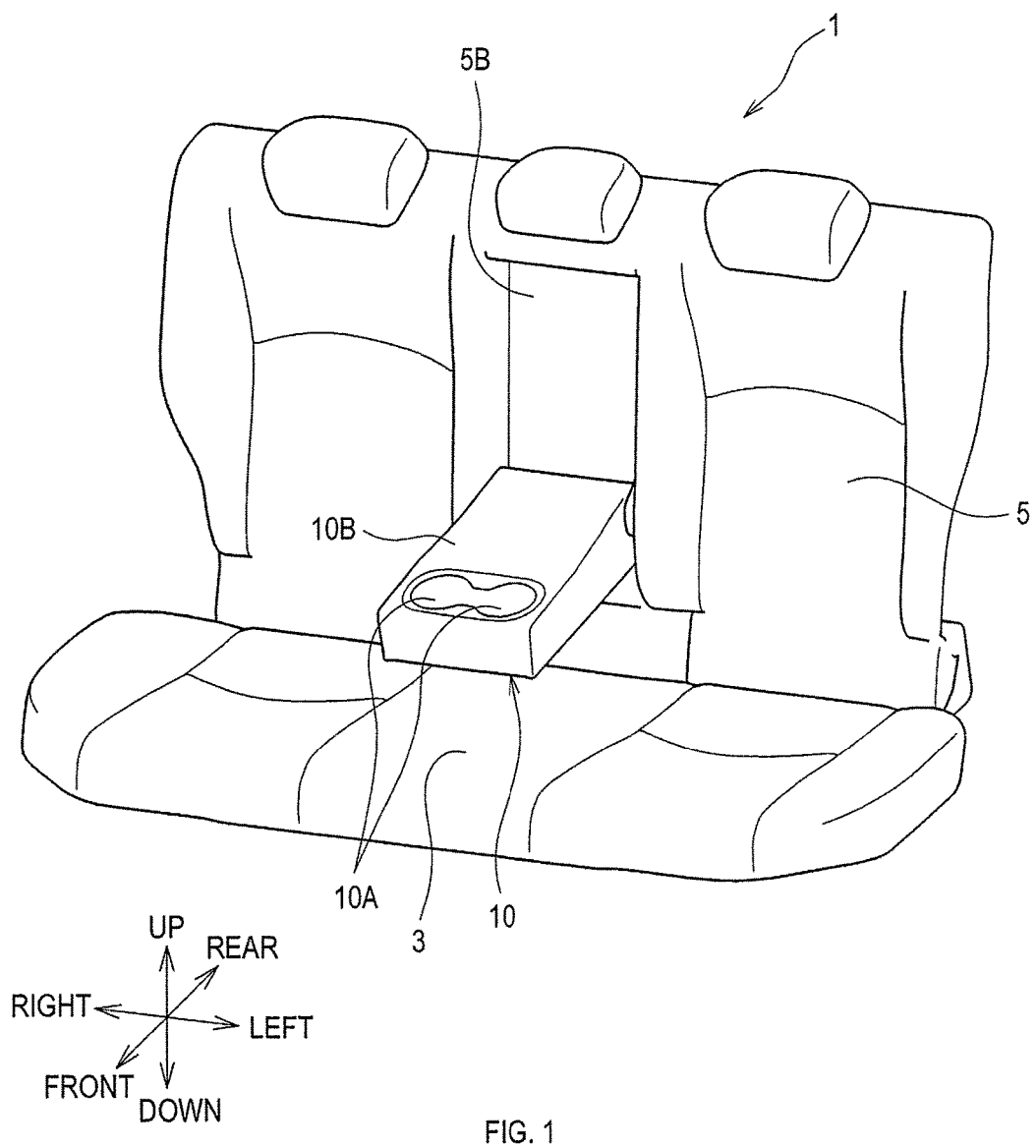
FIG. 1 is a perspective view showing a vehicle seat according to an embodiment of the present disclosure.

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawing are made for easy understanding of relationship between each drawing. Arrows and other marks (directions) labelled on each drawing do not limit the scope of the present disclosure.

At least with respect of a member or portion that is labeled with a reference numeral for explanations, there is at least one in number of such a member or portion unless the number is otherwise specified, for example, as "one of". In other words, there may be two or more of such a member or portion disposed.

First Embodiment

In the present embodiment, a rear seat of a passenger car will be described. The directions in the following description indicate the directions of the armrest for a vehicle seat according to the present embodiment being assembled in a vehicle.

1. Overview of Vehicle Seat

As shown in FIG. 1, a vehicle seat 1 comprises at least a seat cushion 3 and a seatback 5. The seat cushion 3 is a portion to support the buttocks and so on of an occupant. The seatback 5 is a portion to support the back of the occupant.

The vehicle seat 1 according to the present embodiment comprises an armrest 10 disposed in the middle of the vehicle seat 1 in the seat width directions. The armrest 10 forms an armrest and so on for an occupant (or occupants). At one end of the armrest 10 in its extending direction, a recess is provided that forms, for example, cup holders 10A.

The armrest 10 is pivotably attached to a seatback 5. That is, the armrest 10 is pivotable between an in-use position shown in FIG. 1 and a stored position. The in-use position is where a top surface 10B of the armrest 10 is substantially horizontal.

The stored position is where the armrest is at the opposite end of its range of motion from the in-use position and the top surface 10B is tilted relative to the top surface 10B when the armrest 10 is in the in-use position. In the present embodiment, the armrest 10 in the stored position is accommodated in a recess 5B of the seatback 5. In other words, when the armrest 10 is in the in-use position, the extending direction of the armrest 10 is substantially parallel to the front-rear directions of the vehicle seat 1.

When the armrest 10 is in the in-use position, the cup holders 10A are located in the front end portion of the armrest 10 in the front-rear directions of the vehicle seat 1. When the armrest 10 is in the stored position, the cup holders 10A are located in the upper end portion of the armrest 10.

Thus, when the armrest 10 is in the in-use position, a pivot center line Lo (see FIG. 2) of the armrest 10 is located at the rear end of the armrest 10 in the front-rear directions of the vehicle seat 1. When the armrest 10 is in the stored position, the pivot center line Lo is located at the bottom end of the armrest 10.

2. Structure of Armrest

Figure 2:
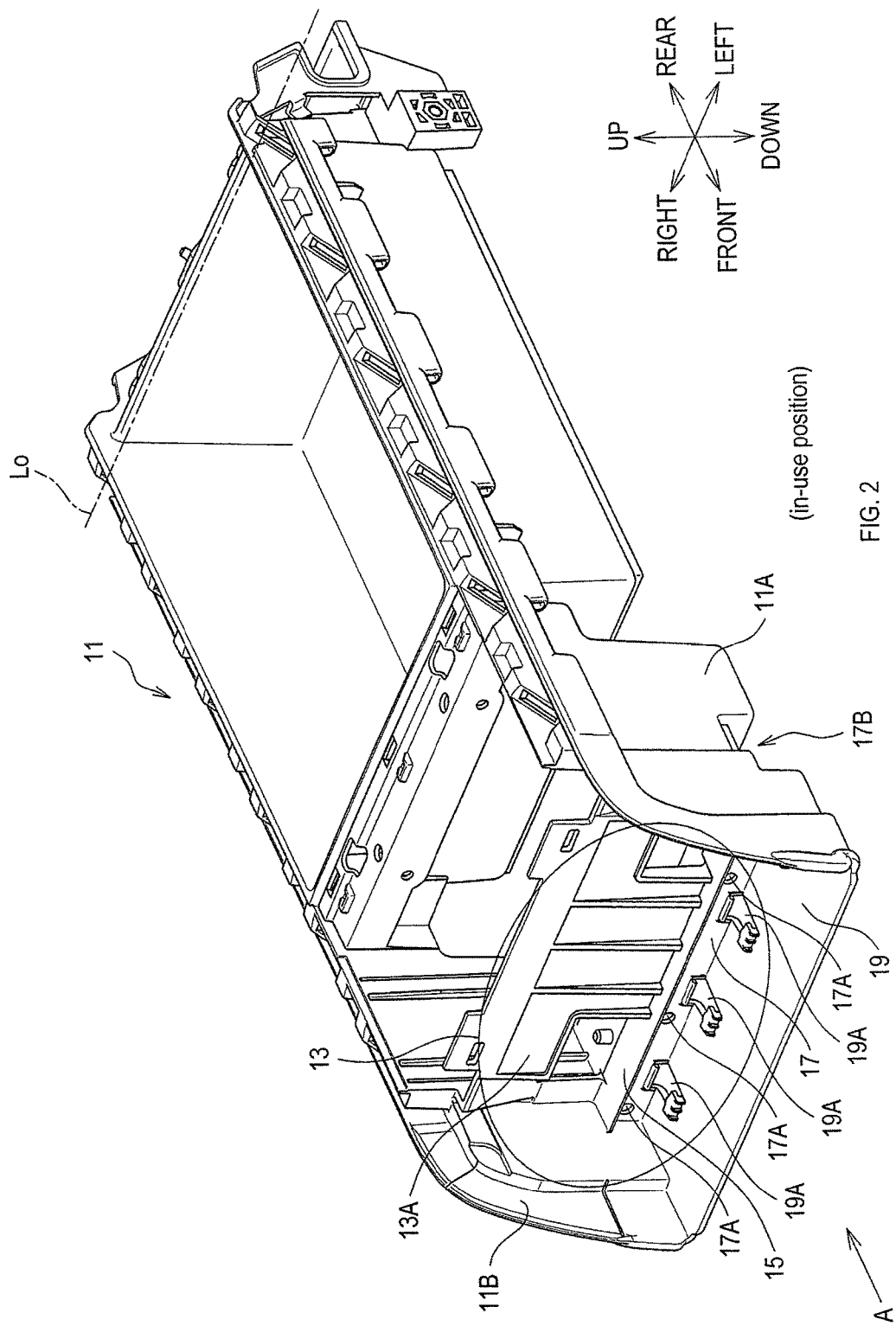
FIG. 2 is a perspective view showing an armrest box (armrest) according to the embodiment.

An armrest box 11 shown in FIG. 2 is a box-shaped shell structure that forms the framework of the armrest 10. That is, the armrest box 11 forms the framework of the armrest 10 with, for example, a reinforcing wall 13A that partitions the space inside the frame of the armrest 10 into some rooms (spaces).

Figure 3:
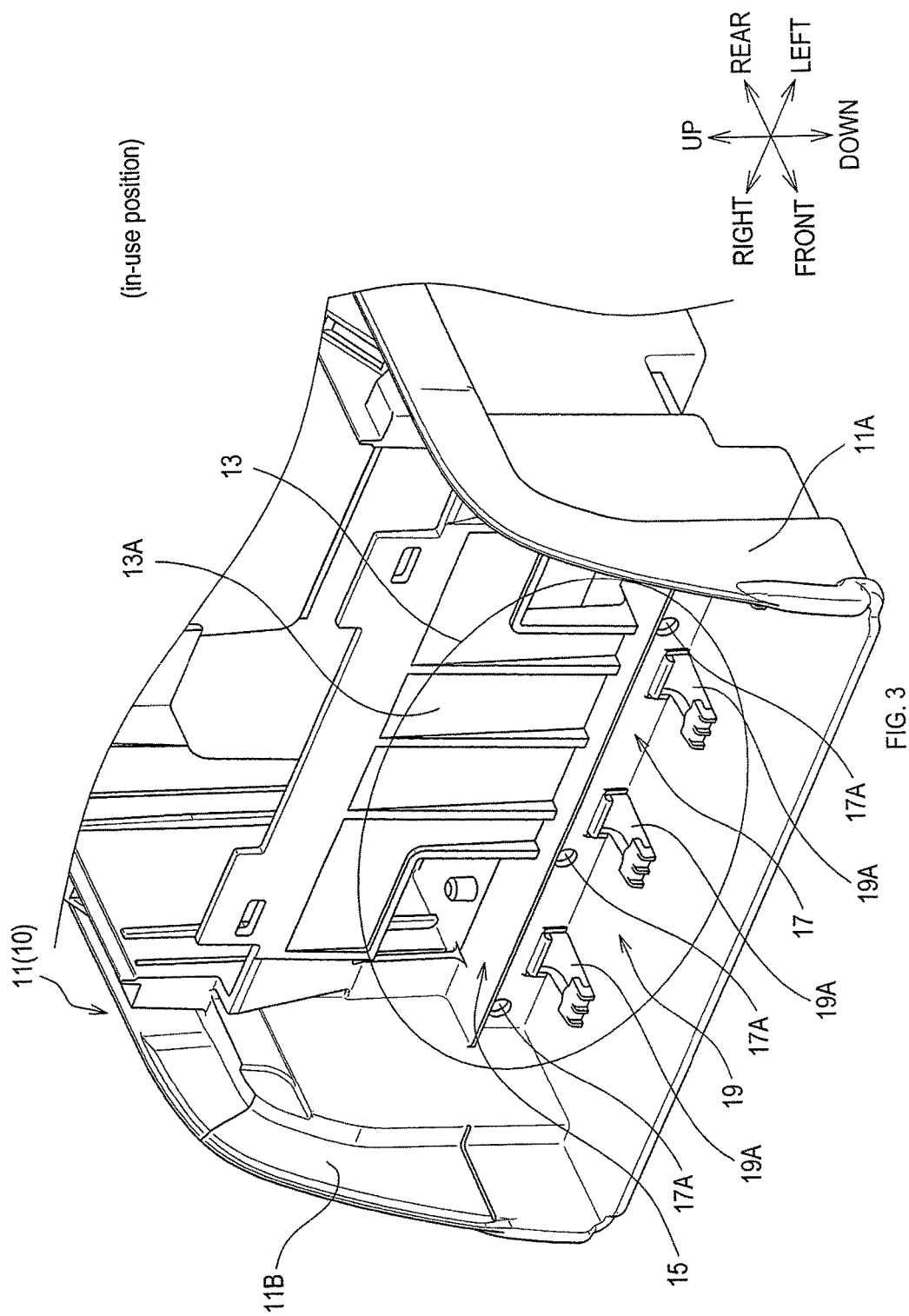
FIG. 3 is an enlarged view showing a front end portion of the armrest box according to the embodiment.

As shown in FIG. 3, in the vicinity of the leading edge of the armrest box 11 in its extending direction (hereinafter referred to as the leading edge), a cup holder portion 13, a first blocking portion 15 and a second blocking portion 17 are provided. The cup holder portion 13 is defined by the reinforcing wall 13A, and the cup holders 10A are accommodated and attached inside the cup holder portion 13.

That is, the space located toward the leading edge relative to the reinforcing wall 13A serves as the cup holder portion 13. A portion of the armrest box 11 located toward the leading edge relative the reinforcing wall 13A is open toward the upper side in the in-use position and toward the front side of the seat 1.

In other words, among the spaces partitioned by the reinforcing wall 13A, two side walls 11A, 11B and a bottom plate 19, the cup holder portion 13 is the space located toward the leading edge relative to the reinforcing wall 13A. The side walls 11A and 11B are respectively disposed in both sides in the width directions of the armrest box 11 and respectively extend in the aforementioned extending direction.

The width directions of the armrest box 11 are parallel to the pivot center line Lo of the armrest 10. In the present embodiment, the width directions, that is, the directions parallel to the pivot center line Lo correspond to the seat width directions.

Figure 5:
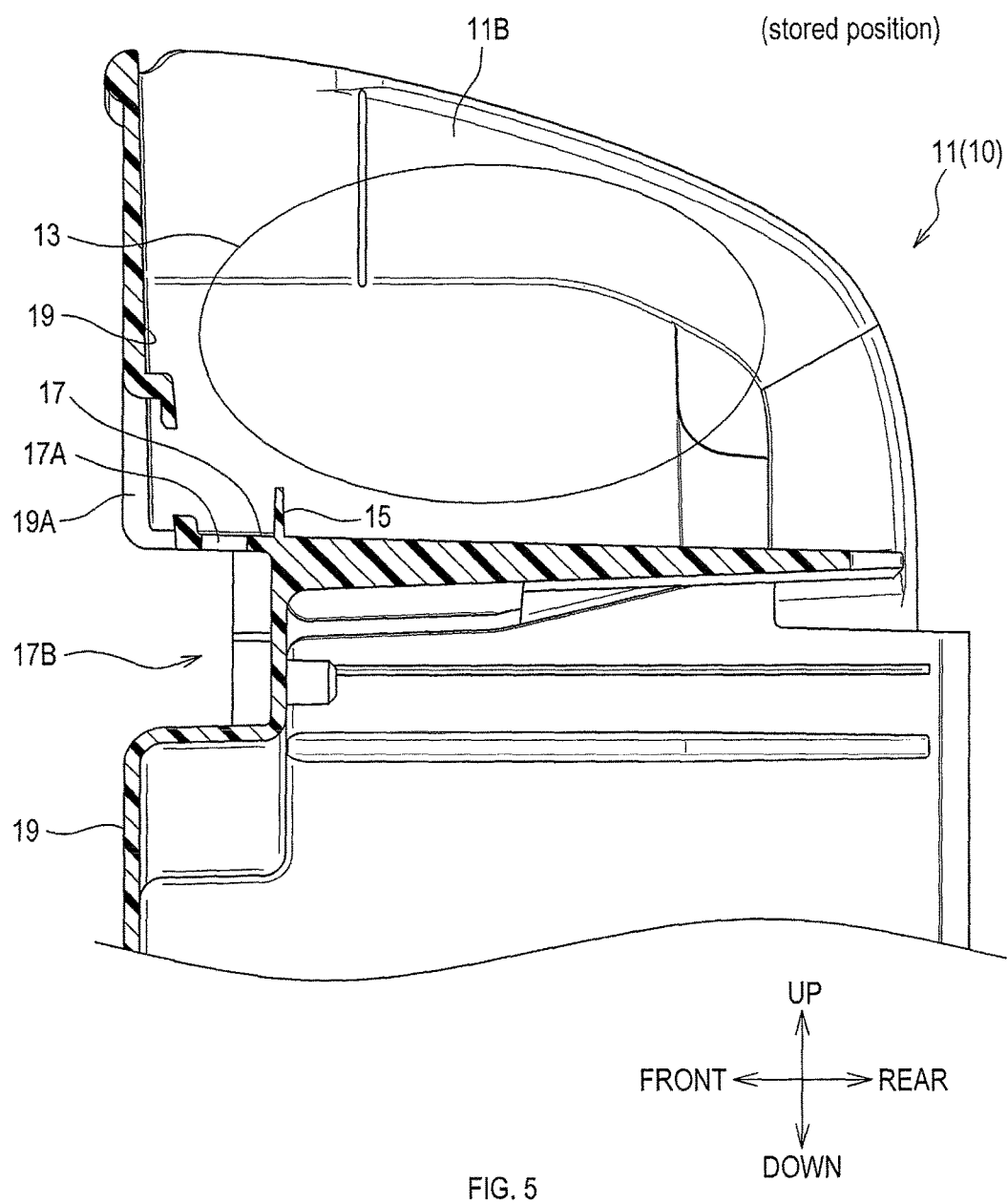
FIG. 5 is a sectional view cut along with a line V-V in FIG. 4.

The first blocking portion 15 is a wall-like portion disposed toward the pivot center line Lo relative to the cup holder portion 13. The first blocking portion 15 is a wall-like projection that extends parallel to the pivot center line Lo and, as shown in FIG. 5, projects upwardly when the armrest 10 is in the stored position.

The second blocking portion 17 extends in the vicinity of the root of the first blocking portion 15, that is, in a portion of the first blocking portion 15 that is located toward the pivot center line Lo. The second blocking portion 17 is a wall-like portion that extends parallel to the extending directions of the first blocking portion 15 so as to be interposed between the cup holder portion 13 and the pivot center line Lo.

The armrest box 11 according to the present embodiment is made of resin and integrally formed with the reinforcing wall 13A, the side walls 11A, 11B, the first blocking portion 15, the second blocking portion 17, and the bottom plate 19.

Figure 4:
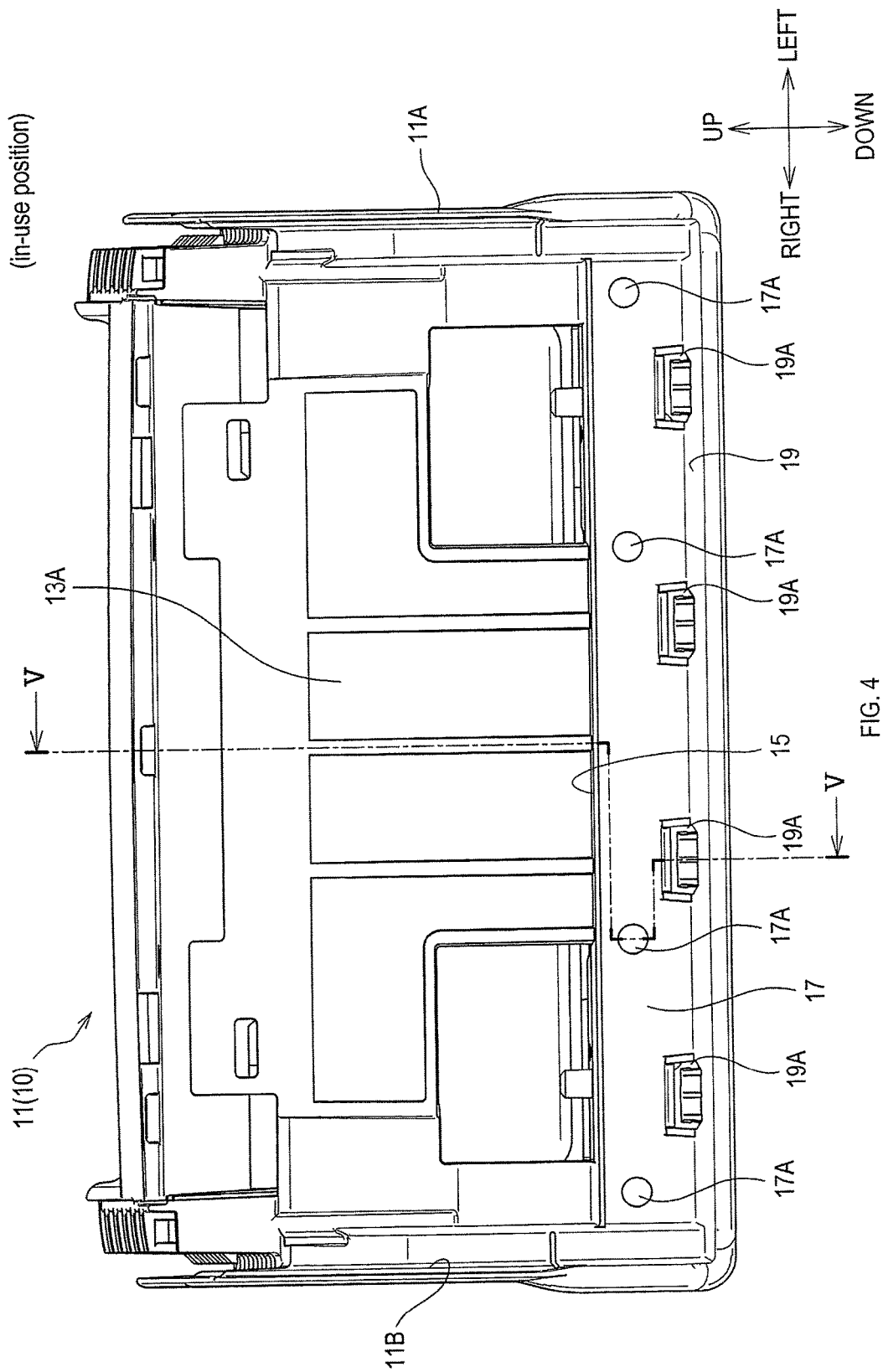
FIG. 4 is an enlarged fragmentary view showing a portion of the armrest box shown in FIG. 2 from the direction of an arrow A.

As shown in FIG. 4, the second blocking portion 17 is provided with first through holes 17A that penetrate the second blocking portion 17 for communication from the cup holder portion 13 toward the pivot center line Lo. The first through holes 17A are aligned in the extending directions of the second blocking portion 17, that is, in the seat width directions.

The upper ends of the first through holes 17A are located, when the armrest 10 is in the in-use position, below the first blocking portion 15. As shown in FIG. 2, a concave 17B is provided on the other side of the second blocking portion 17 from the cup holder portion 13, in other words, in the side of the second blocking portion 17 toward the pivot center line Lo.

The concave 17B is open toward the bottom plate 19 and extends in the width directions of the armrest box 11 so as to communicate with each of the first through holes 17A. When the armrest 10 is in the stored position, the concave 17B is located below the second blocking portion 17.

A portion of the bottom plate 19 located toward the leading edge relative to the reinforcing wall 13A is situated, as shown in FIG. 4, below the lower ends of the first through holes 17A when the armrest 10 is in the in-use position. As shown in FIGS. 4 and 5, the bottom plate 19 is provided with second through holes 19A that penetrates the bottom plate 19.

The second through holes 19A are each disposed in the middle in the extending directions of the second blocking portion 17 between two adjacent first through holes 17A.

3. Feature of Armrest for Vehicle Seat

In the present embodiment, when the armrest 10 is brought to the stored position while liquid droplets have accumulated at the bottom of the cup holder portion 13, the liquid droplets are blocked at the first blocking portion 15 (see FIG. 5).

The blocked liquid droplets go through the first through holes 17A provided at the second blocking portion 17 and are discharged via the concave 17B. Accordingly, liquid droplets formed due to condensation can be inhibited from entering the inside of the armrest 10 while being inhibited from staying inside of the armrest 10.

When the armrest 10 is in the in-use position, the upper ends of the first through holes 17A are disposed below the first blocking portion 15 (see FIG. 4). Due to this configuration, when the armrest 10 is in the in-use position, the flow of liquid droplets above the first through holes 17A is blocked by the first blocking portion 15. Accordingly, liquid droplets that have flowed from the cup holder portion 13 to the second blocking portion 17 are discharged from the first through holes 17A when the armrest 10 is in the in-use position.

The bottom plate 19, located below the lower ends of the first through holes 17A when the armrest 10 is in the in-use position, is provided with second through holes 19A penetrating the bottom plate 19 (see FIG. 4). This configuration allows liquid droplets that have flowed from the cup holder portion 13 to the second blocking portion 17 to be discharged from the second through holes 19A when the armrest 10 is in the in-use position.

Other Embodiments

When the armrest 10 is in the in-use position, the upper ends of the first through holes 17A do not have to be located below the first blocking portion 15.

The bottom plate 19 does not have to be provided with the second through holes 19A.

The aforementioned embodiment describes an armrest for a vehicle seat configured as a rear seat for a passenger car as an example. Nevertheless, the present disclosure may be utilized as an armrest for vehicle seats for other automobiles or of railway vehicles, vessels, and aircrafts.

Further, the present disclosure is not limited to the above-described embodiments as long as the present disclosure conforms to the gist of the disclosure recited in the claims. Accordingly, a configuration may be employed that is a combination of at least two of the above-described embodiments.

What is claimed is:

1. An armrest for a vehicle seat, the armrest being attached to the vehicle seat in a pivotable manner between an in-use position and a stored position, the in-use position being where the armrest is substantially horizontal and the stored position being where the armrest is at an opposite end of a range of motion of the armrest from the in-use position, the armrest comprising:
   a cup holder portion;
   a first blocking portion disposed toward a pivot center line of the armrest relative to the cup holder portion in a wall-like manner, extending parallel to the pivot center line, and projecting upwardly when the armrest is in the stored position;
   a second blocking portion extending in a vicinity of a root of the first blocking portion in a wall-like manner parallel to extending directions of the first blocking portion so as to be interposed between the cup holder portion and the pivot center line, the second blocking portion comprising at least one first through hole that penetrates the second blocking portion for communication from the cup holder portion toward the pivot center line.

2. The armrest according to claim 1, wherein, when the armrest is in the in-use position, an upper end of the at least one first through hole is located below the first blocking portion.

3. The armrest according to claim 2 further comprising a bottom plate disposed below a lower end of the at least one first through hole when the armrest is in the in-use position, the bottom plate comprising at least one second through hole penetrating the bottom plate.

* * * * *